United States Patent

[11] 3,633,534

[72] Inventor Gerald W. Hersey
    Phoenix, Ariz.
[21] Appl. No. 1,087
[22] Filed Jan. 7, 1970
[45] Patented Jan. 11, 1972
[73] Assignee Sperry Rand Corporation

[54] MECHANICAL ANNUNCIATOR FOR INDICATING THE POSITION OF THE ACTUATION SHAFT OF A SELECTOR SWITCH
8 Claims, 2 Drawing Figs.

[52] U.S. Cl.............................................. 116/124,
    33/204, 73/178, 116/129, 116/133, 200/4, 340/27,
    343/107
[51] Int. Cl.............................................. G09f 9/00
[50] Field of Search.................................. 116/124,
    114, 129, 133, DIG. 43, 1; 33/204.2, 204; 58/22.7;
    73/178; 200/4; 340/27 NA; 343/112 PT, 107, 108

[56] References Cited
    UNITED STATES PATENTS
2,360,935 10/1944 Carlson ........................ 33/204 X

| | | | |
|---|---|---|---|
| 2,419,928 | 4/1947 | Wiggin et al.............. | 116/124 |
| 3,220,252 | 11/1965 | Wright........................ | 73/178 |
| 3,277,484 | 10/1966 | Bostwick.................... | 343/107 |
| 3,460,146 | 8/1969 | White et al. ............... | 343/112 |

Primary Examiner—Louis J. Capozi
Attorney—S. C. Yeaton

ABSTRACT: A mechanical annunciator for indicating the position of the actuation shaft of a selector switch comprising a flag selectively positioned in view or out of view in accordance with two positions of the shaft. When the flag is positioned out of view, a first arrow is rendered visible pointing toward a first legend and when positioned in view, the flag obscures the first arrow and exposes to view a second arrow on the flag pointing toward a second legend. A cantilevered spring, to which the flag is attached, selectively cooperates with two dimensionally different portions of the shaft in accordance with the two shaft positions respectively, in order to position the flag.

PATENTED JAN 11 1972  3,633,534

PRIOR ART

INVENTOR.
GERALD W. HERSEY
BY
*HP Hersey*
ATTORNEY

MECHANICAL ANNUNCIATOR FOR INDICATING THE POSITION OF THE ACTUATION SHAFT OF A SELECTOR SWITCH

BACKGROUND OF THE INVENTION

1. Field of the Invention

The present invention relates to mechanical annunciators for indicating the position of the actuation shaft of a selector switch particularly of the type used in aircraft flight instruments for mode selection.

2. Description of the Prior Art

Aircraft flight instruments conventionally utilize rotary switches for mode selection. Mode annunciation is usually performed by the position of the selector switch knob with respect to the instrument housing and is displayed by an arrow engraved on the knob. The arrow selectively points to legends representative of the respectively selected modes in accordance with the rotary position of the switch actuation shaft to which the knob is attached. Conventionally, either the knob is not illuminated causing difficulty in ascertaining the mode selected in the often dimly lit cockpit of an aircraft, or a source of illumination separate from the instrument internal lighting is required to illuminate the arrow on the knob. In addition, rotary mode switching frequently requires a relatively complex and hence expensive mechanism to achieve the knob rotation required so that an unambiguous annunciation is obtained with respect to the selected modes.

SUMMARY OF THE INVENTION

The present invention includes a shaft having two portions dimensionally different from one another. The shaft may, for example, be the actuation shaft of an aircraft flight instrument mode selector switch. A flag is selectively positioned in view or out of view in accordance with two positions of the shaft which may select two operating modes of the instrument respectively. When the flag is positioned out of view, a first arrow on the instrument face is rendered visible pointing toward a legend representing a first selected mode. When positioned in view, the flag obscures the first arrow and exposes to view a second arrow on the flag pointing toward a second legend representing a second selected mode. A cantilevered spring to which the flag is attached selectively cooperates with the two dimensionally different portions of the shaft in accordance with the two shaft positions respectively, in order to position the flag.

The first arrow and the two legends may be disposed on the instrument face and the second arrow on the flag, when positioned in view, is disposed substantially flush with the instrument face. Thus, the internal instrument lighting illuminates the arrows and legends rendering these indicia clearly visible without necessitating a separate source of illumination as required in prior configurations. The arrangement of the present invention also provides an unambiguous annunciation of two selected modes since the mechanism of the invention has only two discrete positions with no neutral position.

Additionally, the invention is structurally uncomplicated hence economical to manufacture and reliable in operation compared to prior arrangements. The device is entirely mechanical hence not requiring any electrical power from the instrument in which it is included. The device is also lightweight which is a desirable characteristic for devices for use in aircraft.

DESCRIPTION OF THE PREFERRED EMBODIMENT

For the purposes of explanation, the present invention will be described in terms of inclusion in a Radio Magnetic Indicator aircraft flight instrument generally of the type described on pages 86–88 of "Flying the Omni-Range" by C. A. Zweng and J. Dohm, published in Sept. 1955 jointly by Pan American Navigation Service and Weems System of Navigation. The term Radio Magnetic Indicator will hereinafter be referred to as RMI for convenience.

Figure 1:
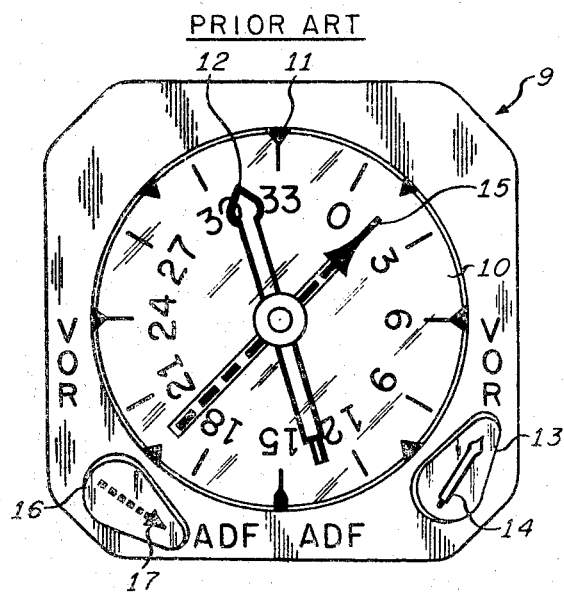
FIG. 1 is a front elevation view of a Radio Magnetic Indicator flight instrument illustrating a prior art mode annunciation arrangement.

Referring now to FIG. 1, an RMI is illustrated incorporating a prior art arrangement for mode annunciation. Although this type of Instrument is discussed in detail in the said Zweng publication, the following description is included for completeness.

A compass card 10 repeats the magnetic heading of the aircraft with respect to an index 11 from the main compass system of the craft. A pointer 12 is utilized to indicate either VOR or ADF bearing with respect to the compass card 10 in accordance with the rotary position of a mode selector switch knob 13. An arrow 14 engraved on the knob 13 annunciates the selected mode, VOR or ADF, in accordance with the legend to which the arrow 14 points. A second bearing pointer 15 functions with a second mode selector switch knob 16 and annunciator arrow 17 in a manner identical to that described with respect to the pointer 12.

It may now be appreciated that in the absence of a source of illumination separate from the internal lighting of the instrument, the arrows 14 and 17 as well as the associated legends may be difficult to read in the often dimly lit cockpit of an aircraft.

It may further be appreciated that relatively complex mechanisms, which are not shown for clarity, must be included to achieve the rotation of the knobs 13 and 16 required so that an unambiguous annunciation is obtained with respect to selected VOR and ADF modes. The knobs 13 and 16 may ambiguously assume positions intermediate the associated legends VOR and ADF unless mechanisms are included to prevent it.

Figure 2:
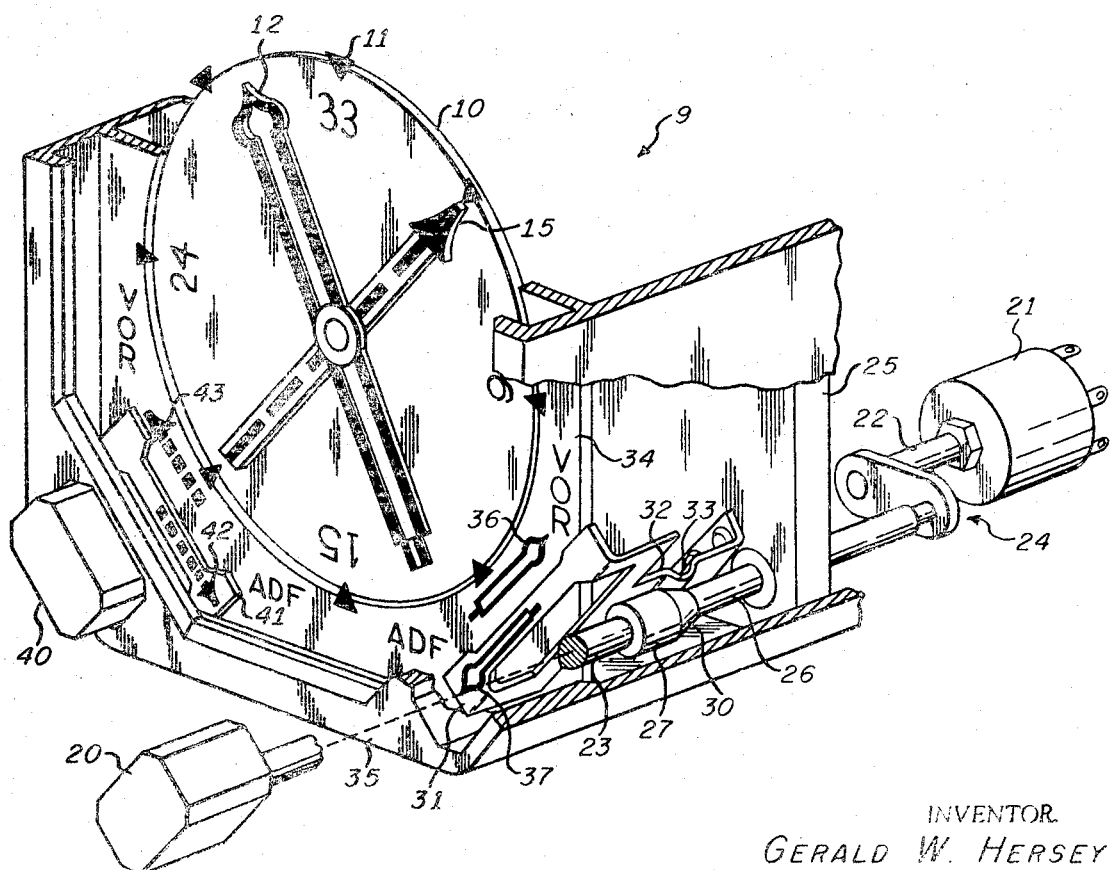
FIG. 2 is a perspective view, partially in section, illustrating a Radio Magnetic Indicator incorporating mode annunciation in accordance with the present invention.

Referring now to FIG. 2, in which like reference numerals indicate like components with respect to FIG. 1, compass card 10, index 11 and bearing pointers 12 and 15 function identically to the similarly numbered components previously discussed with respect to FIG. 1. The VOR and ADF mode is selected for the pointer 12 by a pushbutton knob 20 via a switch 21. The knob 20 is connected to the input shaft 22 of the switch 21 via an actuation shaft 23 and a linkage 24. The switch 21 may be a conventional pushbutton, spring-loaded switch of the push-to-engage and push-to-release type wherein a first electrical contact is established when the shaft 22 is pushed inwardly with respect to the housing of the switch 21. The contact is maintained by a latching mechanism (not shown) internal to the switch 21, the latching mechanism holding the shaft 22 in the inward position. A second inwardly directed push on the shaft 22 releases the latching mechanism, and a spring (not shown) internal to the switch 21 returns the shaft 22 to its outward position, thus establishing a second electrical contact. The switch 21 may therefore be denoted as a bistable switch, e.g., having only two stable positions. The two electrical contacts may be utilized, in a conventional manner, to establish the VOR and ADF modes for the pointer 12. Thus, it may be appreciated that alternate depressions of the pushbutton 20 alternately establishes the VOR and ADF modes for the pointer 12 via the actuation shaft 23, the linkage 24 and the switch input shaft 22. In the VOR mode, the actuation shaft 23 is in the outward position with respect to instrument housing 25 and in the ADF mode, the shaft 23 is in the inward position with respect thereto. It may be appreciated that the mode actuations may be reversed with respect to the positions of the shaft 23.

The actuation shaft 23 includes a portion 26 having a first diameter, a portion 27 having a diameter larger than the first diameter and a tapered portion 30 disposed therebetween.

The shaft portions 26, 27 and 30 are displaced inwardly and outwardly with respect to the housing 25 in the ADF and VOR modes respectively as the pushbutton 20 is alternately depressed in order to change modes. It will be appreciated that the shaft portions 27 and 30 and the portion 26 adjacent the portion 30 form a two level cam member.

A flag 31 is connected to the free end of a cantilevered spring 32. The other end of the spring 32 is fixed to the housing 25 by any suitable fastener. A bearing surface 33, disposed intermediate the ends of the spring 32, is urged toward the actuation shaft 23 by the force of the spring 32 to bear there against. Thus, in the two mode selecting positions of the shaft 23, the bearing surface 33 bears against the two shaft portions 26 and 27, respectively, placing the flag 31 into two corresponding positions with respect to a dial mask 34 of the RMI 9. In the outward position of the shaft 23, the spring 32 urges the bearing surface 33 against the shaft portion 26, thus placing the flag 31 in a retracted position with respect to the dial mask 34. In this retracted position, the flag is out of view behind a bezel 35 of the RMI 9, which condition corresponds to the VOR mode in the herein disclosed embodiment of the present invention.

When the shaft 23 is in its inward position, the bearing surface 33 bears against the shaft portion 27, exposing the flag 31 from behind the bezel 35 and therewith covering the adjacent portion of the dial mask 34. This condition corresponds to the ADF mode in the present embodiment.

A miniature arrow 36, similar in shape to that of the pointer 12, is disposed on the portion of the dial mask 34 adjacent the flag 31. The arrow 36 points toward the legend VOR, also disposed on the dial mask 34, as illustrated in FIG. 2. A second miniature arrow 37, identical in shape to the arrow 36 is disposed on the outer surface of the flag 31 but pointed in a direction opposite to that of the arrow 36 toward the legend ADF disposed on the dial mask 34. In the retracted position of the flag 31, the arrow 36 is exposed to view and the arrow 37 is obscured behind the bezel 35. In the exposed position of the flag 31, the arrow 37 is exposed to view and the arrow 36 is obscured behind the flag 31.

In operation, when the pointer 12 is displaying VOR information with respect to the compass card 10, the shaft 23 is in its outward position causing the flag 31 to be retracted behind the bezel 35 exposing the arrow 36 pointing toward the legend VOR, thus annunciating this mode.

When it is desired to switch the pointer 12 to the ADF mode, the pushbutton 20 is depressed thus latching the shaft 23 into its inward position. The bearing surface 33 rides up the inclined surface 30 from the shaft portion 26 to the shaft portion 27 thus exposing the arrow 37 to view and covering the arrow 36. The arrow 37 pointing toward the legend ADF annunciates this mode.

To return the pointer 12 to the VOR mode, the pushbutton 20 is again depressed thereby releasing the latching mechanism of the switch 21. The shaft 23 returns to its outward position, thus causing the bearing surface 33 to ride down the inclined surface 30 from the shaft portion 27 to the shaft portion 26 again annunciating the VOR mode.

It is to be understood that a second bearing pointer 15 may be included in the RMI 9 with all of the associated elements corresponding to those discussed with respect to the pointer 12. For clarity only a pushbutton 40, a flag 41, miniature arrows 42 and 43 and the legends VOR and ADF are illustrated in FIG. 2. It is to be understood that the operation of the pointer 15 and its associated elements function in a manner identical to that explained above with respect to the pointer 12.

Since the miniature arrows 36 and 37 are similar in shape to that of the pointer 12 and the arrows 42 and 43 associated with the pointer 15 are similar in shape thereto, the two pointer mode annunciators illustrated in FIG. 2 are readily distinguishable from one another and identifiable with the respectively associated pointers 12 and 15.

It may now be appreciated that since the arrows and legends associated with the annunciators are disposed at the instrument face, the internal lighting of the instrument illuminates these indicia rendering them clearly visible even in the often dimly lit cockpit of an aircraft without necessitating a separate source of illumination as required in prior configurations.

It may further by appreciated that since the mode selector and annunciator mechanism described above has only two discrete positions, unambiguous mode annunciation is achieved without necessitating the inclusion of separate mechanisms to effect this result as required in prior configurations.

It should also be appreciated that not only is an established selected mode clearly annunciated, but the present invention also catches the eye of the viewer when the mode is changed. The VOR arrow 36 on the instrument face not only points toward the VOR legend but is located closer thereto than to the ADF legend. Similarly, when the flag 31 is in view, the ADF arrow 37 points toward the ADF legend and is located closer thereto than to the VOR legend. Since the arrows 36 and 37 may be identical in color and shape with respect to each other and the background color of the flag 31 may be identical to the background color of the dial mask 34; and further since the switching time of the annunciation is very fast, an optical illusion is created which makes the arrow appear to jump from the VOR legend to the ADF legend, which illusion catches the eye of the viewer clearly annunciating that the mode has been changed.

A further embodiment of positioned invention may be realized by disposing the arrows and legends so that the arrow 36 and the associated VOR legend are on the instrument face and the arrow 37 and the associated ADF legend are on the flag 31. In the retracted position of the flag 31, the arrow 36 is exposed pointing to the exposed VOR legend. When positioned in view, the flag 31 obscures the arrow 36 and the VOR legend and exposes the arrow 37 pointing to the exposed ADF legend.

While the invention has been described in terms of arrows 36, 37, 42 and 43, it will be appreciated that other known pointing symbols may be utilized to the same effect.

While the invention has been described in its preferred embodiment, it is to be understood that the words which have been used are words of description rather than limitation and that any changes made within the purview of the appended claims, may be made without departing from the true scope and spirit of the invention in its broader aspects.

What is claimed is:

1. An annunciator comprising
   shaft means adapted to assume two positions,
   a relatively stationary member having a first pointing symbol disposed thereon pointing toward a first indicium,
   flag means having a second pointing symbol disposed thereon pointing toward a second indicium, and
   cam means coupled to said shaft means and adapted to cause said flag means to assume first and second positions corresponding to said two positions of said shaft means, respectively, said flag means being retracted from view in said first position and exposed to view in said second position,
   said flag means being so constructed and arranged with respect to said relatively stationary member that with said flag means in said first position said first pointing symbol is exposed to view and with said flag means in said second position, said first pointing symbol is obscured from view therebehind and said second pointing symbol is exposed to view.

2. A device of the character recited in claim 1 in which said cam means comprises two level cam means and said flag means comprises
   bearing means urged into contact with said cam means, and
   a flag member connected to said bearing means having said second pointing symbol disposed thereon,
   said bearing means bearing on said two levels of said cam means when said shaft means assumes said two positions, respectively, thereby positioning said flag member in said first and second positions, respectively.

3. A device of the character recited in claim 2 in which said bearing means comprises a cantilevered spring fixed on one end with respect to said relatively stationary member and having a bearing surface urged into contact with said cam means by the spring force thereof.

4. A device of the character recited in claim 1 further including switch means having only two stable positions and coupled to said shaft means so as to cause said shaft means to assume said two positions.

5. A device of the character recited in claim 4 in which said switch means comprises a push-to-engage and push-to-release electrical switch.

6. An annunciator comprising a push-to-engage, push-to-release switch having only two stable positions, shaft means coupled to actuate said switch thereby assuming two positions, a relatively stationary member having an indicium disposed thereon, flag means having a further indicium disposed thereon, and cam means coupled to said shaft means and adapted to cause said flag means to assume first and second positions corresponding to said two positions of said shaft means, respectively, said flag means being retracted from view in said first position and exposed to view in said second position, said flag means being so constructed and arranged with respect to said relatively stationary member that with said flag means in said first position said indicium is exposed to view and with said flag means in said second position, said indicium is obscured from view therebehind and said further indicium is exposed to view.

7. A device of the character recited in claim 6 in which said cam means comprises two level cam means and said flag means comprises bearing means urged into contact with said cam means, and a flag member connected to said bearing means having said further indicium disposed thereon, said bearing means bearing on said two levels of said cam means when said shaft means assumes said two positions, respectively, thereby positioning said flag member in said first and second positions, respectively.

8. A device of the character recited in claim 7 in which said bearing means comprises a cantilevered spring fixed on one end with respect to said relatively stationary member and having a bearing surface urged into contact with said cam means by the spring force thereof.

* * * * *